(12) United States Patent
Lindermeir et al.

(10) Patent No.: US 7,021,669 B1
(45) Date of Patent: Apr. 4, 2006

(54) COUPLING PART FOR A FLUID COUPLING DEVICE

(75) Inventors: Wolfgang Lindermeir, Untermarchtal (DE); Ulrich Schaub, Ulm (DE); Reiner Haeufele, Laupheim (DE)

(73) Assignee: Gardena Manufacturing GmbH, (DE)

( * ) Notice: Subject to any disclaimer, the term of this patent is extended or adjusted under 35 U.S.C. 154(b) by 0 days.

(21) Appl. No.: 09/958,196

(22) PCT Filed: Mar. 30, 2000

(86) PCT No.: PCT/EP00/02776

§ 371 (c)(1),
(2), (4) Date: Feb. 7, 2002

(87) PCT Pub. No.: WO00/60269

PCT Pub. Date: Oct. 12, 2000

(30) Foreign Application Priority Data

Apr. 3, 1999 (DE) ................ 199 15 291

(51) Int. Cl.
*F16L 55/00* (2006.01)
(52) U.S. Cl. ............... 285/86; 285/401; 285/319; 285/317
(58) Field of Classification Search ............... 285/86, 285/85, 84, 316, 317, 82, 396, 391, 315, 285/361, 401, 360, 376, 314, 319, 307, 81
See application file for complete search history.

(56) References Cited

U.S. PATENT DOCUMENTS

| 980,677 | A | * | 1/1911 | Rhoads | 285/360 |
|---|---|---|---|---|---|
| 1,232,193 | A | * | 7/1917 | Bowes, Jr. | 285/376 |
| 1,916,449 | A | * | 7/1933 | Tompkins | 285/376 |
| 2,049,290 | A | * | 7/1936 | Burns et al. | 285/401 |
| 2,245,847 | A | * | 6/1941 | Bagby | 285/361 |
| 2,450,527 | A | * | 10/1948 | Smith et al. | 285/361 |
| 2,843,401 | A | * | 7/1958 | Rogers | 285/82 |
| 3,100,655 | A | * | 8/1963 | Work | 285/401 |
| 3,116,942 | A | * | 1/1964 | Morello, Jr. | 285/85 |
| 3,162,470 | A | * | 12/1964 | Davidson et al. | 285/86 |
| 3,470,524 | A | * | 9/1969 | Culver | 285/361 |
| 3,847,393 | A | * | 11/1974 | Busselmeier | 285/315 |
| 4,477,109 | A | * | 10/1984 | Kleuver | 285/361 |
| 4,637,432 | A | | 1/1987 | Medvick et al. | |
| 4,673,199 | A | * | 6/1987 | Renfrew | 285/316 |
| 4,681,350 | A | * | 7/1987 | Gaita | 285/315 |

(Continued)

FOREIGN PATENT DOCUMENTS

CH 31806 * 2/1905 ................ 285/376

(Continued)

*Primary Examiner*—Aaron Dunwoody
(74) *Attorney, Agent, or Firm*—Akerman Senterfitt

(57) ABSTRACT

A coupling part for a fluid coupling device, especially a hose coupling, which has a looking device switchable between two positions. The locking device has locking elements mounted on a base body, and a socket-shaped actuating element that interacts with the locking elements. The coupling part is switchable between a retaining and releasing positions by an axial releasing movement of the actuating element. In the retaining position, the locking elements hold the counterpart of the coupling, e.g. a hose stem, to prevents it from being pulled out and, in the releasing position, the locking elements release the same in order to disengage the coupling. The actuating element can be moved from the retaining position into a locking position, prohibiting a releasing movement, by rotating the actuating element in a limited manner around the longitudinal axis of the coupling. As a result, the coupling is prevented from being unintentionally disengaged.

17 Claims, 2 Drawing Sheets

U.S. PATENT DOCUMENTS

| | | | |
|---|---|---|---|
| 4,915,421 A | | 4/1990 | Dennany Jr. |
| 5,087,086 A | * | 2/1992 | Snedeker .................... 285/361 |
| 5,145,276 A | * | 9/1992 | Demange ................... 285/360 |
| 5,190,224 A | * | 3/1993 | Hamilton .................... 285/376 |
| 5,466,020 A | * | 11/1995 | Page et al. ................. 285/361 |
| 5,727,739 A | * | 3/1998 | Hamilton .................... 285/361 |
| 5,779,277 A | * | 7/1998 | Street .......................... 285/79 |
| 5,871,241 A | | 2/1999 | Van Essen |
| 5,884,943 A | * | 3/1999 | Katzer et al. ................. 285/38 |
| 6,129,334 A | * | 10/2000 | Kuwabara ............... 251/149.6 |
| 6,199,913 B1 | * | 3/2001 | Wang ......................... 285/319 |
| 6,467,816 B1 | * | 10/2002 | Huang ........................ 285/309 |

FOREIGN PATENT DOCUMENTS

| | | | | |
|---|---|---|---|---|
| DE | 1775302 | | 5/1971 | |
| DE | 2651855 A1 | | 5/1978 | |
| EP | 0926422 A2 | | 6/1999 | |
| FR | 1435899 | * | 3/1966 | ................ 285/376 |
| JP | 10-002474 | | 6/1998 | |

\* cited by examiner

COUPLING PART FOR A FLUID COUPLING DEVICE

BACKGROUND OF THE INVENTION

The invention relates to a coupling part for a fluid coupling device, particularly a hose coupling, which has two coupling parts which can be brought into a coupling position by fitting into one another and which can be detached from one another by pulling apart.

Detachable fluid coupling devices of this type are e.g. known from quick coupling plug systems. In the case of the latter the substantially fluid-tight coupling position can be obtained by simply fitting into one another a coupling inner part and a coupling outer part. In quick couplings of this type, one of the coupling parts, generally the coupling outer part, has a switchable locking device, which is provided for locking the coupling parts in the coupling position in order to prevent an undesired pulling apart of the coupling parts. The locking device has at least one locking element mounted on a basic body of the coupling part and an actuating element cooperating therewith and which is frequently constructed as an actuating sleeve surrounding the basic body of the coupling part. As a result of a release movement of the actuating element directed in a release direction, the locking device can be shifted from a retaining position into a release position between a locking configuration and a release configuration. In the locking configuration the coupling parts fitted into one another in the coupling position are secured against extraction by the at least one locking element and can be drawn apart in the release configuration.

DE 17 75 302 discloses different embodiments of such fluid coupling devices, which are characterized by particularly easy operation. One embodiment operable with one hand has on the coupling outer part an actuating element in the form of a sleeve, which is axially displaceable relative to a basic body of the coupling part, in a holding position keeps the locking elements in the locking configuration and as a result of a longitudinal displacement of the coupling device releases the latter.

It has been found in practice that in this very advantageous embodiment as a result of its ease of operation, it can arise under unfavourable circumstances that the locking device is unintentionally shifted into its release configuration, e.g. by playing children or by a longitudinal movement of the hand of a user along a fluid line having the coupling. The unintentional fluid escape can in part have unpleasant consequences.

In another quick coupling type known from DE 34 90 017, a measure has already been proposed in order to make impossible or at least difficult such a chance or unintentional shifting of an actuating sleeve. For this purpose it is proposed to use a stop button carried by the actuating sleeve and movable in the direction of the longitudinal axis of the coupling and also away therefrom between a retaining position and a release position, whilst also having abutment means cooperating therewith in the retaining position thereof to prevent a movement of the actuating sleeve into the release position and after the disengagement of the abutment means the stop button can be moved into its release position. For unlocking the retaining position it is firstly necessary to depress the stop button and only then is it possible to displace the actuating sleeve. Although the resulting barrier for the actuating sleeve is effective, operation is cumbersome and the construction of the coupling device is made complicated as a result of the numerous cooperating parts.

The problem of the invention is to provide a simply constructed and easily operable coupling part of a fluid coupling device of the aforementioned type, where an unintentional disconnection of the coupling is reliably prevented.

This problem is solved by a coupling part having the features of claim 1 and a fluid coupling device having the features of claim 13. Advantageous further developments appear in the dependent claims. By reference the wording of all the claims is made into part of the content of the present description.

In such coupling parts the problem is solved in that the locking device can be blocked by moving the actuating element into a locking position and the actuating element is movable into a locking position blocking the release of the locking device. In particular, in the locking position the release movement of the actuating element is blocked. Due to the resulting, planned blockability of release of the coupling, for the disconnection of said coupling it is necessary to carry out a prior, deliberate moving back of the barrier, so that an unintentional disconnection can no longer occur. By a simple movement of the actuating element the barrier can be switched into the locking position and can be released again by a normally oppositely directed movement from the locking position. As a result of the invention the coupling part or actuating element, in addition to its known function, acquires a further functionality, without additional components-being needed for the provision of a barrier.

The locking position of the actuating element clearly differs from the retaining position. It is similar to the retaining position inasmuch as also in the locking position the locking elements are in a locking configuration preventing a disconnection of the coupling parts. However, unlike in the retaining position of the actuating element, for the release of the coupling no simple movement into the release position is possible and instead a more complex movement sequence is required, in which normally the actuating element must initially be moved back into the retaining position and then into the release position. It is improbable and excluded in practice that these two movements, which preferably are in opposite directions, are unintentionally performed or are initiated by chance due to external effects. Thus, fluid coupling devices equipped with the coupling parts according to the invention are particularly reliable in operation, without their handling being made significantly more complicated.

The invention can e.g. be implemented with quick couplings of the type disclosed by DE 34 90 017, in which the actuating member is actively brought into the release position for coupling in and must then be moved into its retaining position for locking the coupling parts. However, particular preference is given to embodiments in which the coupling parts can be brought into the coupling position without actuation and/or movement of the actuating element, because as a result the fitting together of the coupling parts can take place particularly rapidly and easily. Thus, the invention can be used with particular advantage in all quick coupling embodiments described in exemplified manner in DE 17 75 302, whose features are, by reference, made into part of the content of this description.

Therefore the situation can be such that the coupling part has a main or basic body, in which are provided several, e.g. three locking elements arranged around the circumference of the main body. The locking elements are preferably in the form of separate insert bodies, which are guided in axially fixed manner in openings of the main body and which in each case have cam sections provided for engaging on one another under the action of spring tension in an e.g. annular groove-like recess of the other coupling part, e.g. a hose nipple, for the purpose of locking together the coupling parts. On both axial faces the cam section appropriately has inclined surfaces in the manner of insertion bevels, so that inter alia the fitting together of the coupling parts without actuation or movement of the actuating element is aided. The actuating element is preferably an actuating sleeve which embraces the basic body at least in the vicinity of the locking elements and which has on its inside closing faces, which cooperate with the radial outsides or backs of the locking elements in such a way that in the retaining position of the sleeve the locking elements are radially supported to the outside and are so wedged between the inner part and the closing face that an outward movement is largely prevented, whereas in the sleeve release position an outward movement is possible permitting the pulling apart of the coupling parts. The switching between the retaining and release positions can take place by rotating the sleeve about its longitudinal axis or by axial sleeve displacement and in particular in the case of axial displaceability of the actuating sleeve between the retaining and release positions, a one-handed operation of the coupling is easily possible.

The preferably sleeve-like actuating element, although it can have a non-sleeve shape, is consequently preferably movably arranged with respect to the basic body of the coupling part, is preferably pretensioned in its retaining position and for releasing the coupling can be moved from the retaining position into the release position in a release direction, which is preferably the longitudinal direction of the coupling part or basic body. A particularly simple operation of the locking means is brought about in that the actuating element can be moved from the retaining position into the locking position by moving in a release direction at right angles and in particular perpendicular thereto. This locking direction is, in the case of a longitudinally displaceable actuating element, preferably the circumferential direction of the coupling, so that for locking the actuating element must be turned about the longitudinal axis of the coupling, starting from the retaining position. In the case of actuating elements, whose rotation brings about a coupling release, the setting of the locking position can take place correspondingly, e.g. by a longitudinal displacement of the actuating element.

In these preferred further developments the full functionality of the preferred coupling parts described e.g. in DE 17 75 302 are retained and a user can operate such couplings in the normal manner. According to preferred embodiments of the invention to said functionality with which the user is acquainted, is added a further functionality, namely the possibility of locking the coupling against unintentional disconnection as a result of a special movement of the actuating sleeve.

In preferred further developments this additional security function can be obtained without additional components on the coupling solely through appropriate modifications of the shape of existing components, more particularly as a result of the construction of the cooperating projections and recesses positive engagement elements are created which bring about the locking function. This is advantageously achieved in that the actuating element, preferably on its inside facing the basic body, has at least one stop running at right angles and in particular perpendicular to the release direction and which extends transversely to the release direction over a limited stop length and which cooperates with a counterstop of the basic body in such a way that the actuating element, starting from the retaining position and whilst bypassing the stop is movable in the release direction up to the release position and starting from the locking position by the stop striking against the counterstop in the release direction is blocked in such a way that a direct, linear movement into the release position is impossible. Thus, for release purposes, the counterelement must perform a detour round the stop, for which purpose the actuating element must be correspondingly moved, particularly rotated.

It is alternatively or additionally possible to provide at least one circumferentially bounded stop on the basic body and for a counterelement cooperating therewith to be located on the actuating element.

Particularly advantageous from the manufacturing standpoint are further developments in which the stop and/or counterstop are constructed in one piece with the component carrying the particular element, i.e. the actuating element or the basic body. Thus, inventively operating coupling parts can e.g. be inexpensively made from plastic, in that the moulds conventionally used for manufacture are slightly modified for shaping stops or counterstops.

To aid easy, faultless operation an indicating device can be provided, with the aid of which the blocked or unblocked state of the coupling can be rendered optically visible. For example, on the basic body and on the actuating element can be applied marks or signs, e.g. by imprints, whose relative position differs in the blocked and unblocked state.

Operational reliability and security can be increased in that latching means are provided for the latching securing of the actuating element in the retaining position and in the locking position and which are constructed in such a way that the actuating element can only be shifted between the retaining position and locking position by overcoming a latching resistance. Thus, both an undesired locking of the coupling and also an undesired unlocking are made more difficult and the actuating element remains in stable form in the given position.

These and further features can be gathered from the claims, description and drawings and, either singly or in the form of subcombinations, can be implemented in an embodiment of the invention and in other fields and can represent advantageous, independently protectable constructions.

BRIEF DESCRIPTION OF THE SEVERAL VIEWS OF THE DRAWINGS

Embodiments of the invention are described hereinafter relative to the attached drawings, wherein show.

DETAILED DESCRIPTION OF THE INVENTION

Figure 1:
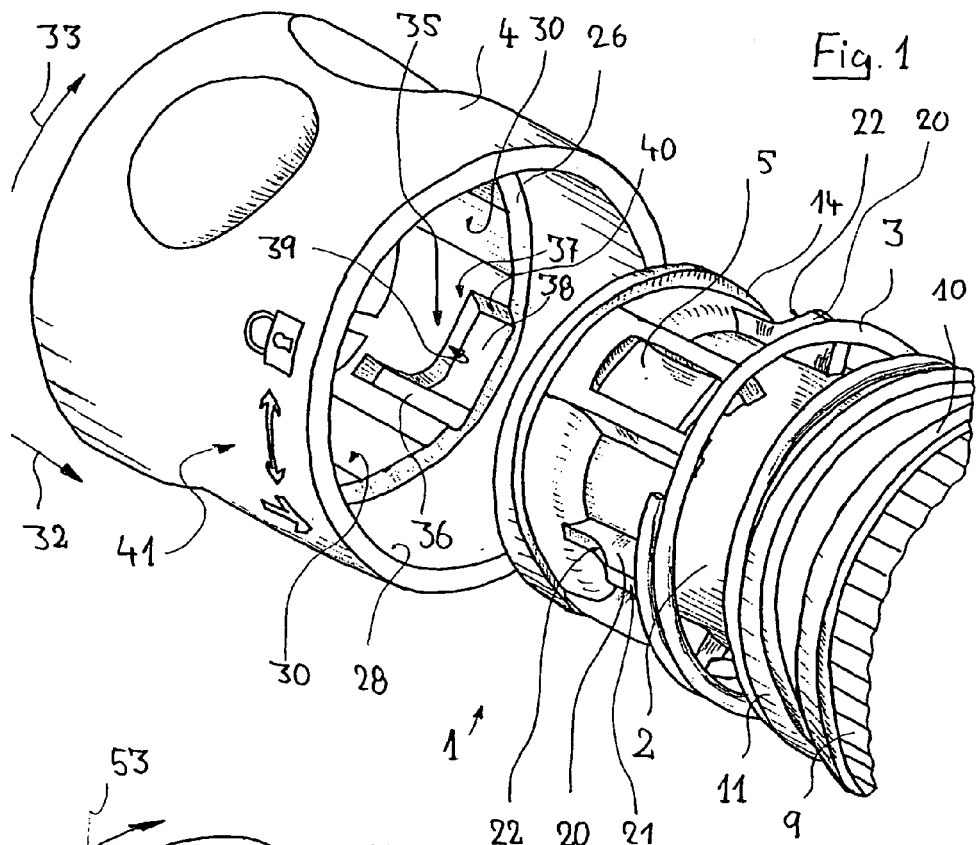
FIG. 1 An inclined perspective partial view of a first embodiment of a coupling part for a hose coupling.

The inclined perspective partial view of FIG. 1 shows essential components of a first embodiment of a coupling part 1 for a fluid coupling device constructed as a hose coupling and which is in the form of a plug coupling and, in addition to the coupling part shown, another, not shown coupling part, e.g. in the form of a hose nipple. The coupling parts can be brought into a fluid-tight coupling position by axial telescoping and can be disconnected again by pulling apart.

The coupling part has a multipart construction and comprises an entirely plastic basic or main body 2, a metallic helical compression spring 3 which can be slipped onto the basic body and an outer sleeve 4, which can be axially inverted over the helical compression spring and the basic body and snapped onto the latter and which serves as the actuating element of the coupling part. In a locking section, the main body 2 has three rectangular openings uniformly distributed about its circumference and into which are insertable in axially fixed manner separate, plastic, self-resilient insert bodies 5. The insert bodies 5 serve as locking elements and have in each case a cam section 6 projecting into the interior of the main body having an axial through opening and which for securing a coupling nipple insertable into the coupling part is constructed as a counterpart of the fluid coupling device in the hose coupling 1.

On its end portion remote from the insertion end, the basic body 2 has a hose connection section 7, in which can be secured an axially mounted hose end by unscrewing a cap nut 9 on an external thread 8. To said thread 8 is connected a collar-like stop 10 for the cap nut. A further collar-like stop 11 following onto the insertion end with an axial spacing is used for axially supporting the spring 3, which is centred by wedge-like centring webs 12. With an axial spacing upstream of the centring webs the locking section is constructed with three openings 13 for the insert bodies 5 uniformly distributed around the basic body circumference. Onto the insertion end of the basic body is shaped an outwardly projecting retaining collar 14, which serves for captively securing the sleeve 4 on the basic body 2.

A special feature of this basic body is that in the locking section, centrally between the openings or insert bodies circumferentially displaced with respect to one another by in each case 120°, three blocking ribs 20 mutually displaced by 120° are constructed in one piece with the basic body. The blocking ribs 20 pass in the longitudinal direction of the basic body, project radially therefrom and have in each case a substantially axially parallel, radial outer face, which in the radial direction projects over the outer circumference of the retaining collar 14, together with an inclined face 22 directed towards the insertion side.

Figure 2:
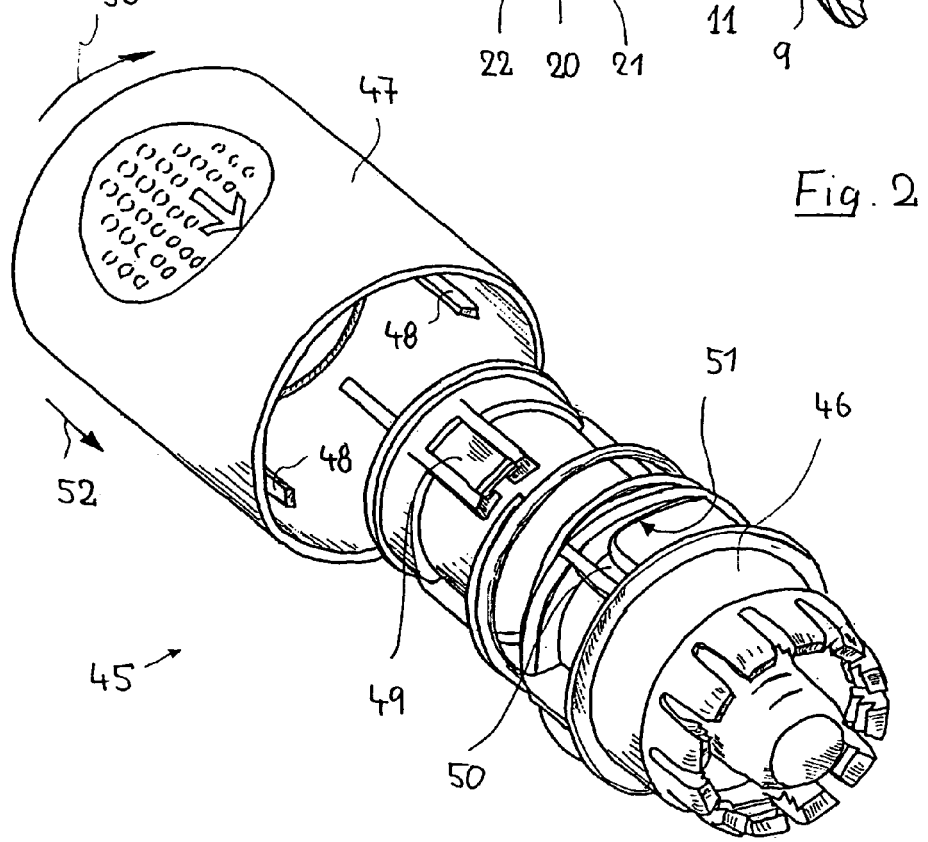
FIG. 2 An inclined perspective view of another embodiment of a coupling part for a hose coupling.
Figure 3:
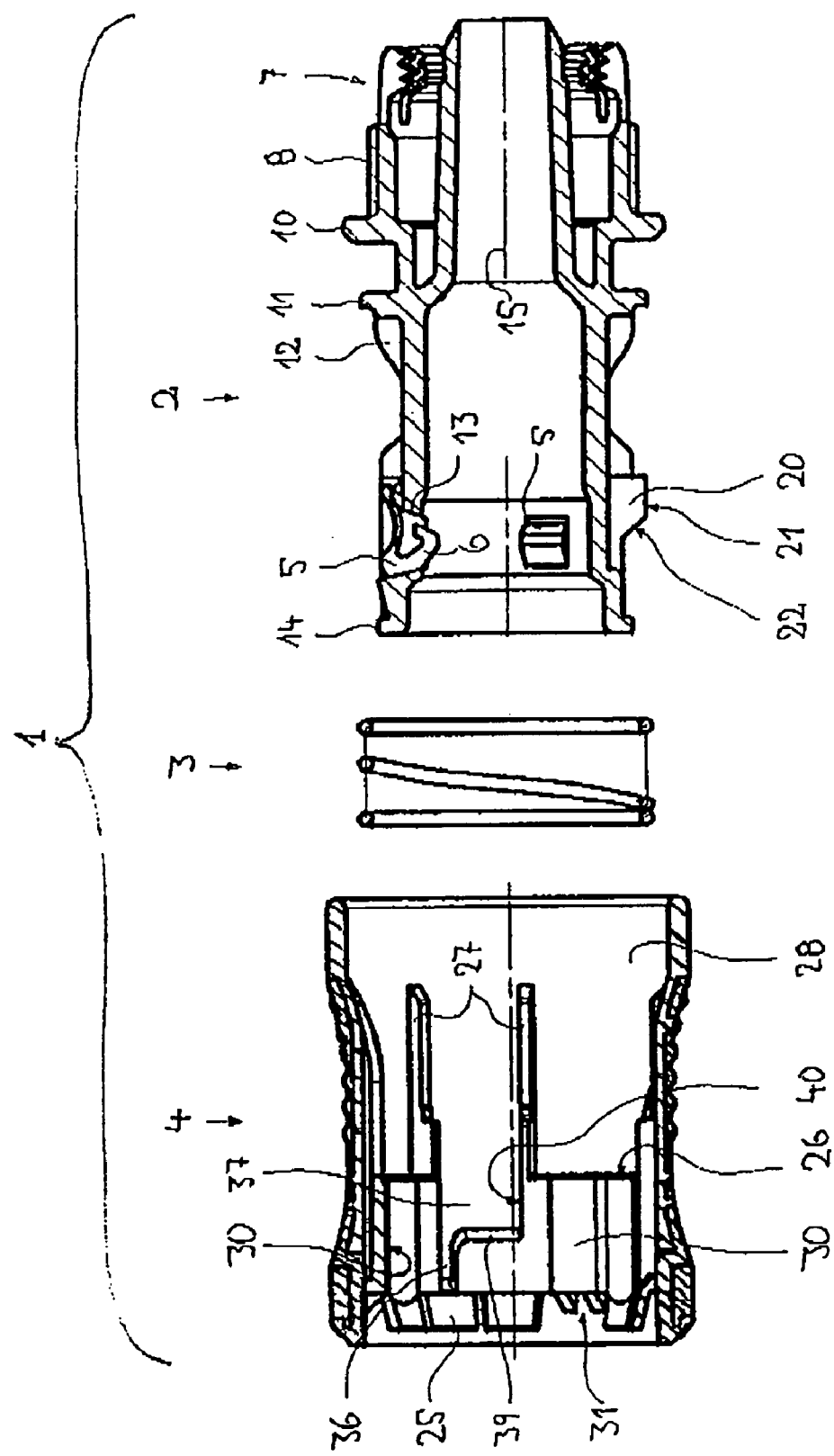
FIG. 3 A vertical longitudinal section through a coupling part similar to the embodiment of FIG. 1 to further illustrate the components thereof.

The sleeve 4, which is made completely from plastic and optionally from a single piece (FIG. 1), has a generally circular cylindrical basic shape and is provided on the outer circumference with gripping depressions, which in the embodiments of FIGS. 2 and 3 are structured with gripping studs, which can be constructed on separate insert elements (FIG. 3). On the insertion side located to the left in FIG. 3 for the coupling counterpart is shaped a ring of inwardly chamfered, springy tongues, which in the case of axial sliding of the sleeve 4 onto the basic body 2 slide away over the retaining collar 14, accompanied by a slight upward bending and then snap radially inwards and by striking on the retaining collar 14 secure in captive manner on the basic body 2 the engaged sleeve 4.

On the sleeve inside is constructed with axial spacing with respect to the retaining tongues 25 a radial ring step 26, which serves to axially support the spring 3. Following onto the step 26 are constructed in the embodiment of FIG. 3 inwardly directed longitudinal ribs 27, which project into the area between the centring ribs 12 and on turning the sleeve relative to the basic body by striking against the ribs 12 limit the rotary movement in both rotation directions.

The inwardly directed ring step 26 separates the area 28 of the sleeve inside, which faces the basic body and which is cylindrical except for the ribs 27, from a closing face area 29, which is located between the ring step 26 and the tongues 25 and in the assembled state of the coupling part externally embraces the area of the spring studs 5 and the blocking ribs 20. In the closing face area 29 are constructed three planar closing faces 30 circumferentially displaced by 120° and to which are connected towards the insertion end in each case two triangular webs 31, whose inwardly directed sloping faces form sliding faces connecting on to the closing faces 30. If the actuating sleeve 4 with respect to the basic body 2 is in an unlocked rotary position, the closing faces 30 engage on the radial backs or outsides of the spring studs 5.

When the sleeve 4 is in its retaining position, which is automatically obtained as a result of the tension of the spring 3, and the sleeve 4 is released, the closing faces 30 fully support the outside or back of the spring studs 5 over the full length, so that an outward movement of the cam section 6 is impossible. The cams are wedged in this locking configuration between the inserted coupling nipple and the closing faces 30 and consequently form a positive extraction preventing means. However, if the sleeve 4 is drawn out of this retaining position by retraction counter to the tension of spring 3 into the release position 32, the end regions of the spring studs facing the retaining collar 14 pass into the area of the webs 31, which permits a pivoting outward movement of the insert bodies 5. In this release position of the sleeve 4 it is consequently possible to extract from the coupling part an engaged coupling nipple.

In the circumferential direction between the closing faces 30 are provided in the embodiments of FIGS. 1 and 3, three generally L-shaped recesses 35, circumferentially displaced by 120°, in the wall material of the sleeve 4. The recesses 35 are constructed so as to cooperate with the blocking ribs 20 and in each case have an axial guidance section 36 constructed in the manner of an axial longitudinal groove and an axial, shorter locking section 37 connecting onto the same on in each case one side. The locking section 37 has a planar bottom face 38, is open to the basic body 2 and forms in the other axial direction an inwardly projecting stop face 39 which, accompanied by the formation of a curvature, extends starting from the guidance section 36 over an inscribed angle of e.g. 40 to 60°.

In the unlocked rotary position of the sleeve 4, i.e. when the closing faces 30 engage directly on the backs of the insert bodies, the axial guides 36 are located in the axial extension of the blocking ribs 20 of the basic body. On retracting the sleeve parallel to the release direction out of the retaining position automatically set by spring tension into a release position the blocking ribs 20 penetrate the guide sections 36, which also serve as a linear guide and as from a certain penetration depth or retraction position of the sleeve 4, prevent a rotation of the sleeve 4 with respect to the basic body.

In the rest or retaining position of the sleeve 4, i.e. before it is retracted in the direction of the hose connection 7, due to the one-sided extension of the recess 35 and the resulting locking section 37, there is a further adjustment possibility for the sleeve with respect to the basic body. In the sleeve rest position the projections of the blocking ribs 20 terminated outwards by the faces 21 are at the axial height of the locking sections 37, so that the sleeve 4, starting from the rest position, can be rotated about a stop-limited rotation angle of e.g. 10 to 90° predetermined by the circumferential extension of the locking sections 37 with respect to the basic body 2. During this rotation in the circumferential or locking direction 33, the radial outer faces 21 of the blocking ribs 20 slide off laterally on the bottom faces 38 until the blocking ribs strike against the lateral limiting faces 40 of the recesses 35 running in the axial direction. As soon as the blocking ribs 20 in the circumferential direction 33 turn into the locking areas 37, the inclined faces 22 of the blocking ribs 20 and the stop faces 39 axially face one another, so that a retraction of the sleeve 4 in the release direction 32 is prevented by the faces 39, 22 striking against one another. Thus, the release movement of the sleeve is blocked following its rotation in the locking direction 33.

Due to the fact that the bottom faces 38 are not cylindrically curved, but are instead planar, the radial spacing between the central axis 15 of the coupling part 1 and the inner wall of the sleeve 4 in the vicinity of the guide section 36 and in the vicinity of the lateral limiting faces 40 is larger than between said areas, so that in the vicinity of the groove 36 and close to the stop face 4, there are preferred energy-based positions for the blocking ribs, where the sleeve 4 is only expanded slightly or not at all by pressure from the inside. Consequently latching means for the latching securing of the actuating element 4 in the retaining position and locking position are formed, between which it is only possible to shift or reverse by overcoming a latching resistance resulting from the fact that on reversal the radial pressure of the blocking rib outsides 21 on the bottom faces 38 is increased.

Starting from the retaining or rest position of the sleeve 4, the latter can be moved into a release position by retraction. In this movement in the release direction 32, the blocking ribs 20 enter the linear guides 36 and the front end portions of the studs 5 pass into the area of the inclined faces 31 and can be moved outwards. However, if starting from the rest position, the sleeve 4 is turned with respect to the basic body in the locking direction to such an extent that the inclined faces 22 of the blocking ribs axially face the stop faces 39 of the sleeve, then the movement in the release direction 32 is prevented or blocked by the blocking ribs 20 impacting the stop faces 39. In this rotary position of the sleeve 4, a release of the spring studs 5 and consequently an unlocking of the coupling is reliably prevented. To this extent any rotary position of the sleeve 4 with respect to the basic body 2, in which the blocking ribs are located in an axial extension of the stop 39 positioned transversely with respect to the release direction is a locking position of the coupling part, where the release movement is prevented by positive cooperation of the blocking ribs 20 with the recesses 35.

It is clear that the coupling part has acquired an additional securing function solely as a result of the special shaping of the outside of the basic body (with the blocking ribs 22 constructed in one piece therewith) and the sleeve (with the appropriately shaped recesses 35). This is characterized in that, starting from its retaining position, by limited rotation the actuating sleeve 4 is movable into a locking position blocking the release movement. To facilitate operation the circumference of the sleeve 4 carries a marking 41 to indicate the sleeve rotation direction for coupling blocking purposes. A corresponding marking can be provided on the basic body making it clear whether the actuating sleeve is in a position permitting the release movement (arrow symbol) or is in a locking position blocking the release movement (lock symbol).

The other embodiment of a coupling part 45 shown in FIG. 2 also has a basic body 46 and a sleeve 47 and represents another possibility for creating this appropriate additional function solely by a suitable shaping of the basic body and sleeve. Precisely as in the embodiment according to FIGS. 1 and 3, the inside of the sleeve can have closing faces like the closing faces 30, 31, which cooperate in the described manner with insert bodies 49 in the openings of the basic body 46. The locking function is obtained here in that on the inner wall of the sleeve 47 facing the basic body 46 is shaped in the direction of the latter at least one elevation and in the embodiment shown there are several elevations in the form of axial longitudinal webs 48. On the basic bodies are provided corresponding, axial longitudinal recesses 50, which are located in the axial extension of the webs 48 with the sleeve 47 in the retaining or rest position. On displacing the sleeve 47 from the rest position into the axial release position 52, the webs 48 slide into the longitudinal recesses and the sleeve 47 can be retracted to such an extent that the locking elements 49 are released for unlocking purposes.

However, the sleeve 47 is not only displaceable longitudinally relative to the basic body 46, but instead starting from its rest position can also be rotated counter to the basic body into a blocked position or a locking position. The rotatability in the locking direction 53 is advantageously restricted by limiting elements in both directions and can take place by engagement. The basic body has in each case on one side, following onto the longitudinal recesses 50, a longitudinal stop 51 extending over a rotational angle about the longitudinal axis of e.g. 10 to 90°. On rotating the sleeve 47 in its rest position with respect to the basic body 46 about the longitudinal axis of the coupling part, the webs 48 are moved into a position where are provided the longitudinally engaging or slightly spaced associated longitudinal stops 51, so that no or at least no significant longitudinal displacement of the sleeve bringing about a release of the locking elements 49 with respect to the basic body is possible. A counterrotation of the sleeve 47 brings it back into the unblocked position, where the webs are again longitudinally displaceable in the associated longitudinal recesses 50.

Alternatively to the embodiments described, it is also possible in a turned position of the sleeves, i.e. in their locking position, not to prevent the longitudinal displacement of the sleeve relative to the basic body and instead only prevent the release of the locking elements 5 or 49 in the case of a longitudinal displacement, so that in the blocked position or in the locking position of the sleeve, said sleeve 4 or 47 is admittedly still longitudinally displaceable, but said longitudinal displacement cannot bring about a release movement, because it cannot cause a disconnection of the coupling.

What is claimed is:

1. A coupling part for a fluid coupling device, the coupling part being connectable and releasable in an axial direction with a corresponding part of a hose coupling, the coupling part comprising:
    a switchable locking device for locking the coupling part to a corresponding hose coupling part in a coupling position in an extraction-prevented manner;
    the locking device comprising
        at least one locking element comprising a resilient insert body having a cam section actable on a corresponding hose coupling part, and
        an actuating element cooperating with the locking element,
    wherein coupling of the coupling part to a corresponding hose coupling part is achieved by axial movement of the coupling part and the hose coupling part together to a retaining position,
    wherein the actuating element is moveable in the axial direction between the retaining position and a release position such that the locking device is switched between a locking configuration and a release configuration, wherein the resilient insert body can be blocked in a locking position preventing release of the coupling parts from the locking configuration by an additional movement of the actuating element, and wherein the actuating element or a main body of the coupling part has at least one substantially L-shaped recess, in which a leg at right angles to the release direction forms a stop and a portion in the release direction forms a linear guide for a counterelement of the main body or actuating element.

2. The coupling part according to claim 1, wherein the coupling part is brought into the retaining position with the corresponding hose coupling part without at least one of actuation and movement of the actuating element.

3. The coupling part according to claim 1, wherein the actuating element is arranged in a movable manner on the coupling part relative to a main body of the coupling part and is pretensioned in its retaining position, and wherein the actuating element is movable in a release direction for the release of the locking device from the retaining position into the release position and can be moved into the locking position by movement in a locking direction perpendicular to the release direction.

4. The coupling part according to claim 3, wherein the movement in the release direction is a displacement in a longitudinal direction of the main body and the movement in the locking direction is a rotation of the actuating element about a longitudinal axis of the main body.

5. The coupling part according to claim 1, wherein the actuating element is an actuating sleeve, which embraces a main body of the coupling part.

6. The coupling part according to claim 1, wherein the actuating element has at least one stop on its inside facing a main body of the coupling part, wherein the at least one stop is oriented perpendicular to the release direction and extends transversely to the release direction over a limited stop length and cooperates with a counterstop of the main body in such a way that the actuating element, starting from the retaining position and whilst bypassing the stop, is movable in the release direction into the release position and, starting from the locking position, is blocked by a counterelement striking against the stop in the release direction.

7. The coupling pan according to claim 1, wherein a main body of the coupling part, on its outside facing the actuating element, has at least one stop perpendicular to the release direction over a limited stop length which cooperates with a counterstop of the actuating element in such a way that the actuating element, starting from the retaining position and whilst bypassing the stop, is movable in the release direction to the release position and, starting from the locking position, is blocked by the counterstop striking against the stop in the release direction.

8. The coupling part according to claim 6, wherein at least one of the stop and the counterelement is constructed in one piece with at least one of the actuating element and the main body.

9. The coupling part according to claim 1, wherein several stops and counterelements are distributed about the circumference of the coupling part.

10. The coupling pan according to claim 1, further comprising an indicating device for an optical indication of the retaining position and the locking position, whose positioning relative to a main body of the coupling part makes it possible to recognize the retaining position and the locking position.

11. The coupling part according to claim 1, wherein a latching device is provided for latching the actuating element in the rest position and in the locking position, wherein the latching device is constructed in such a way that the actuating element can only be shifted between the retaining position and the locking position by overcoming a latching resistance.

12. A fluid coupling device comprising:
a first coupling part and a second coupling part the two coupling parts configured to be brought into a coupling position by axial movement towards each other and to be released by pulling apart,
wherein one of the coupling parts has a switchable locking device for locking the coupling parts in the coupling position, the locking device comprising;
at least one locking element comprising a resilient insert body having a cam section actable on the other of the coupling parts; and
an actuating element cooperating therewith,
wherein coupling of the coupling pans is achieved by axial movement of the coupling parts together to a retaining position,
wherein the actuating element is moveable in the axial direction between the retaining position and a release position such that the locking device is switched between a locking configuration and a release configuration, wherein in the locking configuration the coupling parts are locked in extraction-prevented manner in the coupling position and in the release configuration can be drawn apart,
wherein the locking device can be blocked in a locking position preventing release of the coupling parts from the locking configuration by an additional movement of the actuating element, and
wherein the actuating element or a main body of the coupling part has at least one substantially L-shaped recess, in which a leg at right angles to the release direction forms a stop and a portion in the release direction forms a linear guide for a counterelement of the main body or actuating element.

13. The coupling part according to claim 7, wherein at least one of the stop and the counterelement is constructed in one piece with the actuating element or the main body.

14. The coupling part according to claim 9, wherein three of the group consisting of stops and counterelements are uniformly distributed about the circumference of the coupling part.

15. The coupling part according to claim 1, wherein the actuating element comprises a ring of inwardly chamfered, springy tongues to secure the actuating element on a main body of the coupling part.

16. The coupling part according to claim 11, wherein the latching device comprises at least one planar bottom face interacting with at least one counterelement.

17. The coupling part according to claim 10, wherein the indicating device is comprises markings on at least the actuating element.

* * * * *